(12) United States Patent
Lai et al.

(10) Patent No.: US 11,802,576 B1
(45) Date of Patent: Oct. 31, 2023

(54) FAN DEVICE AND FAN FRAME WITH A BUFFER

(71) Applicant: VAST GLORY ELECTRONICS & HARDWARE & PLASTIC (HUI ZHOU) LTD., Hui Zhou (CN)

(72) Inventors: Jiasheng Lai, Hui Zhou (CN); Shi Man Xu, Hui Zhou (CN)

(73) Assignee: VAST GLORY ELECTRONICS & HARDWARE & PLASTIC (HUI ZHOU) LTD., Hui Zhou (CN)

( * ) Notice: Subject to any disclaimer, the term of this patent is extended or adjusted under 35 U.S.C. 154(b) by 0 days.

(21) Appl. No.: 18/097,981

(22) Filed: Jan. 17, 2023

(30) Foreign Application Priority Data

Oct. 28, 2022 (CN) .......................... 202211338064.3

(51) Int. Cl.
| | |
|---|---|
| *F04D 29/66* | (2006.01) |
| *F04D 19/00* | (2006.01) |
| *F04D 29/053* | (2006.01) |
| *F04D 25/08* | (2006.01) |
| *F16F 1/38* | (2006.01) |

(52) U.S. Cl.
CPC ......... *F04D 29/668* (2013.01); *F04D 19/002* (2013.01); *F04D 25/08* (2013.01); *F04D 29/053* (2013.01); *F16F 1/38* (2013.01)

(58) Field of Classification Search
CPC ...... F04D 29/668; F04D 19/002; F04D 25/08; F04D 29/053; F16F 1/38; F16C 19/527
See application file for complete search history.

(56) References Cited

U.S. PATENT DOCUMENTS

| | | | |
|---|---|---|---|
| 9,897,109 B2 * | 2/2018 | Shen | ...................... F16C 19/527 |
| 2007/0013247 A1 * | 1/2007 | Tung | ...................... F04D 29/668 |
| | | | 310/90 |

FOREIGN PATENT DOCUMENTS

| | | | | |
|---|---|---|---|---|
| CN | 201526631 U | | 7/2010 | |
| CN | 104712590 A | * | 6/2015 | ........... F04D 29/668 |
| TW | I541441 B | | 7/2016 | |
| TW | I543693 B | | 7/2016 | |

OTHER PUBLICATIONS

Machine Translation and foreign patent publication for DE-19708767-A1, Inventor: Nishimuro, Title: Hub for Mounting Blades or Wings on E.g. Fan, Ventilator or Compressor, Published: Nov. 6, 1997. (Year: 1997).*

* cited by examiner

*Primary Examiner* — Mary Davis
(74) *Attorney, Agent, or Firm* — Maschoff Brennan

(57) ABSTRACT

A fan device includes a fan frame and a fan impeller. The fan frame includes a frame and a shaft seat. The shaft seat includes a shaft tube and a buffer. At least a part of the buffer is clamped between the shaft tube and the frame. The fan impeller is rotably disposed on the shaft tube of the shaft seat. An elastic coefficient of the buffer is larger than an elastic coefficient of the shaft tube.

10 Claims, 4 Drawing Sheets

FAN DEVICE AND FAN FRAME WITH A BUFFER

CROSS-REFERENCE TO RELATED APPLICATIONS

This non-provisional application claims priority under 35 U.S.C. § 119(a) on Patent Application No(s). 202211338064.3 filed in China, on Oct. 28, 2022, the entire contents of which are hereby incorporated by reference.

TECHNICAL FIELD

The present disclosure relates to a fan device and a fan frame, more particularly to a fan device and a fan frame with a vibration absorbing structure.

BACKGROUND

As the technology develops rapidly, a computing performance of a processor has also improved significantly, while a huge amount of heat is also generated. In order to ensure that the processor will not be damaged due to high temperature, it is necessary to install a fan in an electronic device to dissipate the heat generated by the processor in the electronic device, so that the processor may operate in a suitable range of the temperature.

However, when the fan is operating, a vibration may be generated by a rotation of the impeller of the fan. Excessive vibration generated by the impeller will not only generate noise, but also be transmitted to other electronic components via a fan frame of the fan, thereby adversely affecting a stability of the electronic components. Therefore, how to reduce the vibration generated by the rotation of the impeller and the noise and the instability of the electronic components generated by the vibration are important issues to be solved.

SUMMARY

The present disclosure provides a fan device and a fan frame, which reduce a vibration generated by a rotation of fan impeller from being transmitted to a fan frame and even other electronic components, thereby reducing noise and an adverse impact on a stability of other electronic components.

One embodiment of the present disclosure provides a fan device including a fan frame and a fan impeller. The fan frame includes a frame and a shaft seat. The shaft seat includes a shaft tube and a buffer. At least a part of the buffer is clamped between the shaft tube and the frame. The fan impeller is rotably disposed on the shaft tube of the shaft seat. An elastic coefficient of the buffer is larger than an elastic coefficient of the shaft tube.

Another embodiment of the present disclosure provides a fan frame configured to support a fan impeller. The fan frame includes a frame and a shaft seat. The shaft seat includes a shaft tube and a buffer. The shaft tube is configured to support the fan impeller. At least a part of the buffer is clamped between the shaft tube and the frame. An elastic coefficient of the buffer is larger than an elastic coefficient of the shaft tube.

According to the fan device and the fan frame disclosed in the above embodiments, since the buffer with a high elastic coefficient and desired vibration absorption capability is clamped between the shaft tube and the frame, the vibration generated by the rotation of the fan impeller is absorbed by the buffer before being transmitted to the frame, so that the vibration transmitted to the frame is significantly reduced. Accordingly, a noise generated by the rotation of the fan impeller and the vibration transmitted to other electronic components may be reduced, thereby maintaining the stability of the operation of other electronic components.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
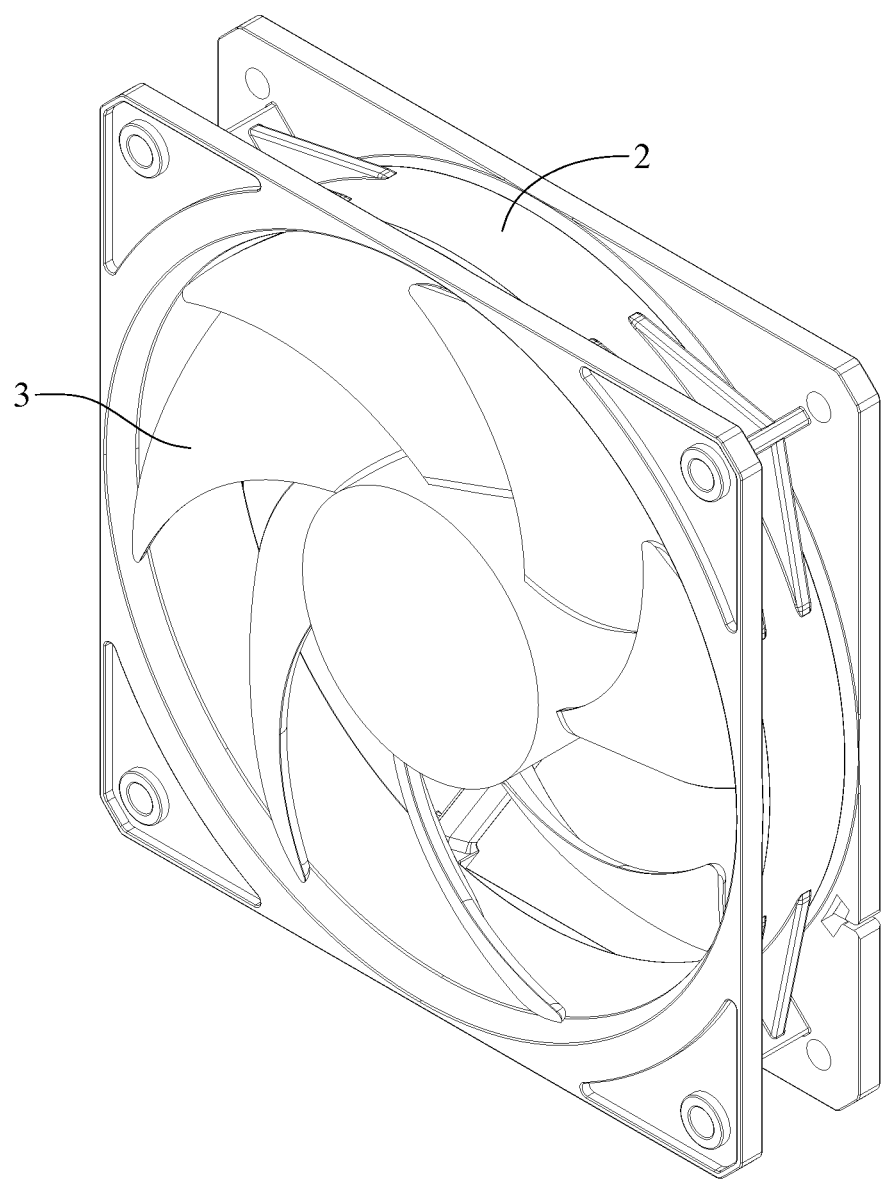
FIG. 1 is a perspective view of a fan device in accordance with the first embodiment of the present disclosure.
Figure 2:
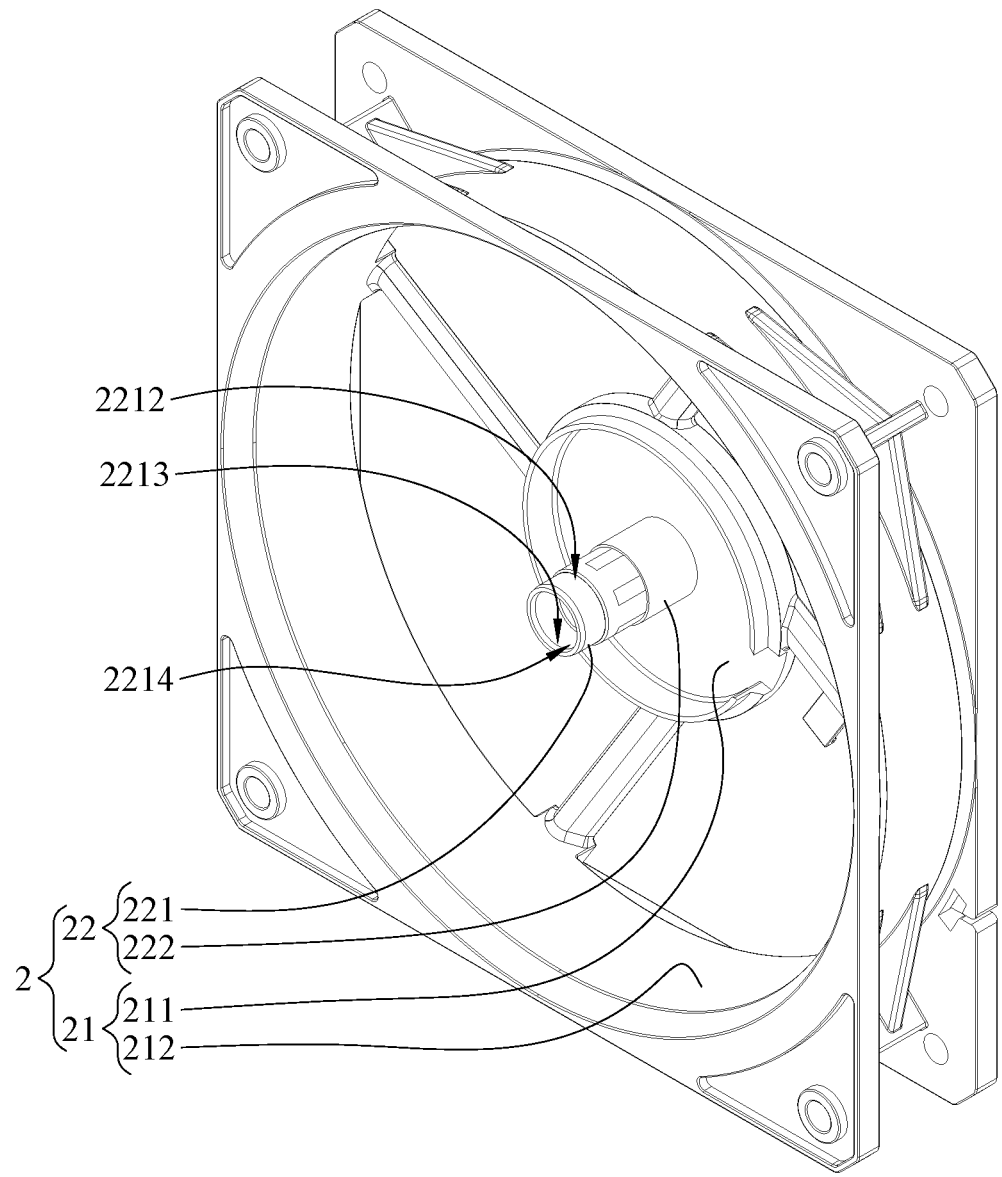
FIG. 2 is a perspective view of a fan frame of the fan device in FIG. 1.

Please refer to FIG. 1 and FIG. 2, where FIG. 1 is a perspective view of a fan device 1 in accordance with the first embodiment of the present disclosure, and FIG. 2 is a perspective view of a fan frame 2 the fan device 1 in FIG. 1.

In this embodiment, the fan device 1 includes a fan frame 2 and a fan impeller 3. The fan frame 2 includes a frame 21 and a shaft seat 22. The frame 21 comprises a base 211 and a surrounding wall 212 connected to each other. The shaft seat 22 includes a shaft tube 221 and a buffer 222. A part of the buffer 222 is clamped between the shaft tube 221 and the frame 21. An elastic coefficient of the buffer 222 is larger than an elastic coefficient of the shaft tube 221. The fan impeller 3 is surrounded by the surrounding wall 212 and is rotably disposed on the shaft tube 221 of the shaft seat 22. Accordingly, when the fan impeller 3 rotates, a vibration generated by the fan impeller 3 may be transmitted towards the frame 21 via the shaft tube 221. However, since a part of the buffer 222 is clamped between the shaft tube 221 and the frame 21, and the elastic coefficient of the buffer 222 is larger than the elastic coefficient of the shaft tube 221, the vibration transmitted from the shaft tube 221 to the frame 21 may be at least partially absorbed by the buffer 222 with the relative larger elastic coefficient, thereby avoiding or reducing the vibration generated by the fan impeller 3 from being transmitted to the frame 21.

Figure 3:
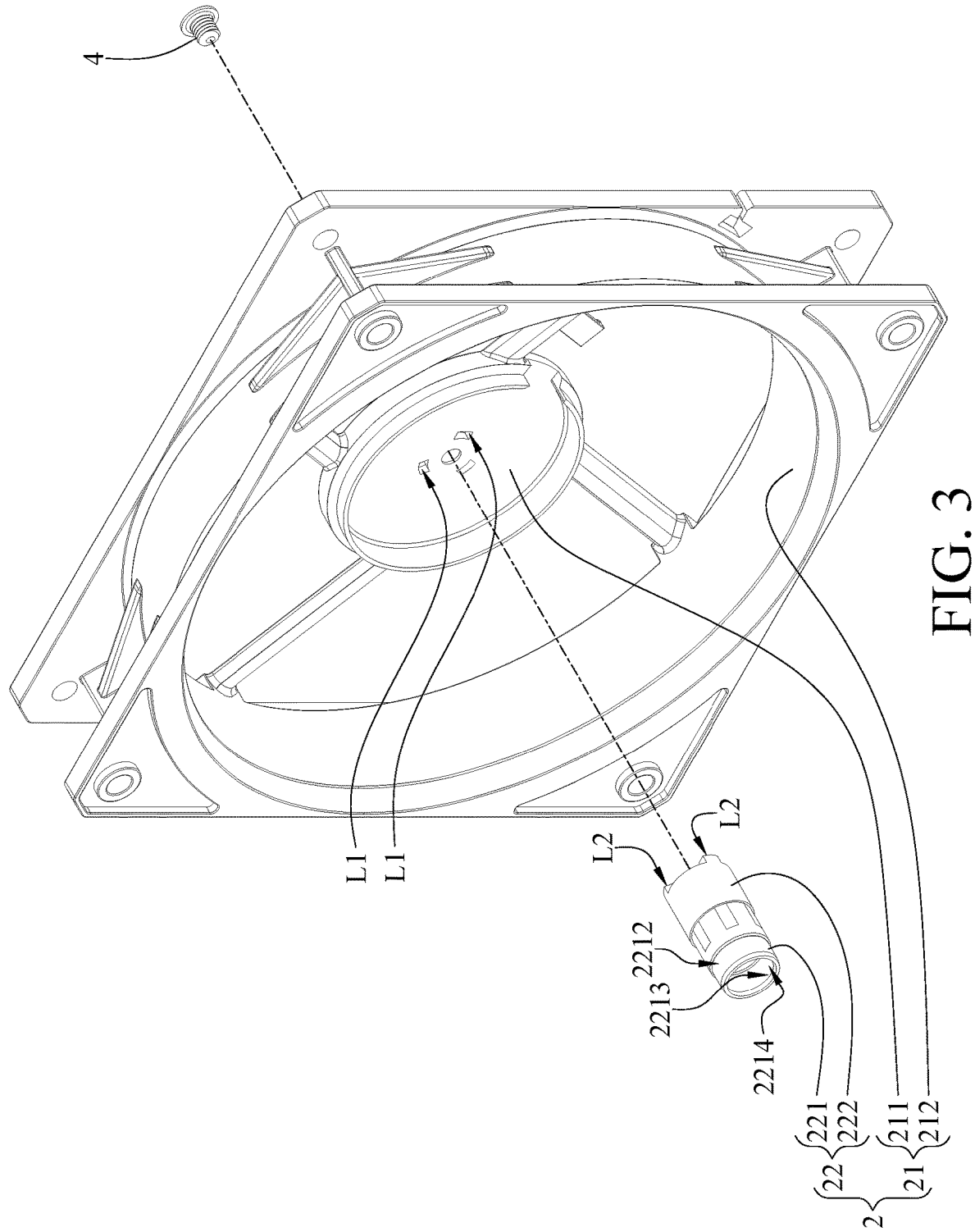
FIG. 3 is an exploded view of the fan frame in FIG. 2.
Figure 4:
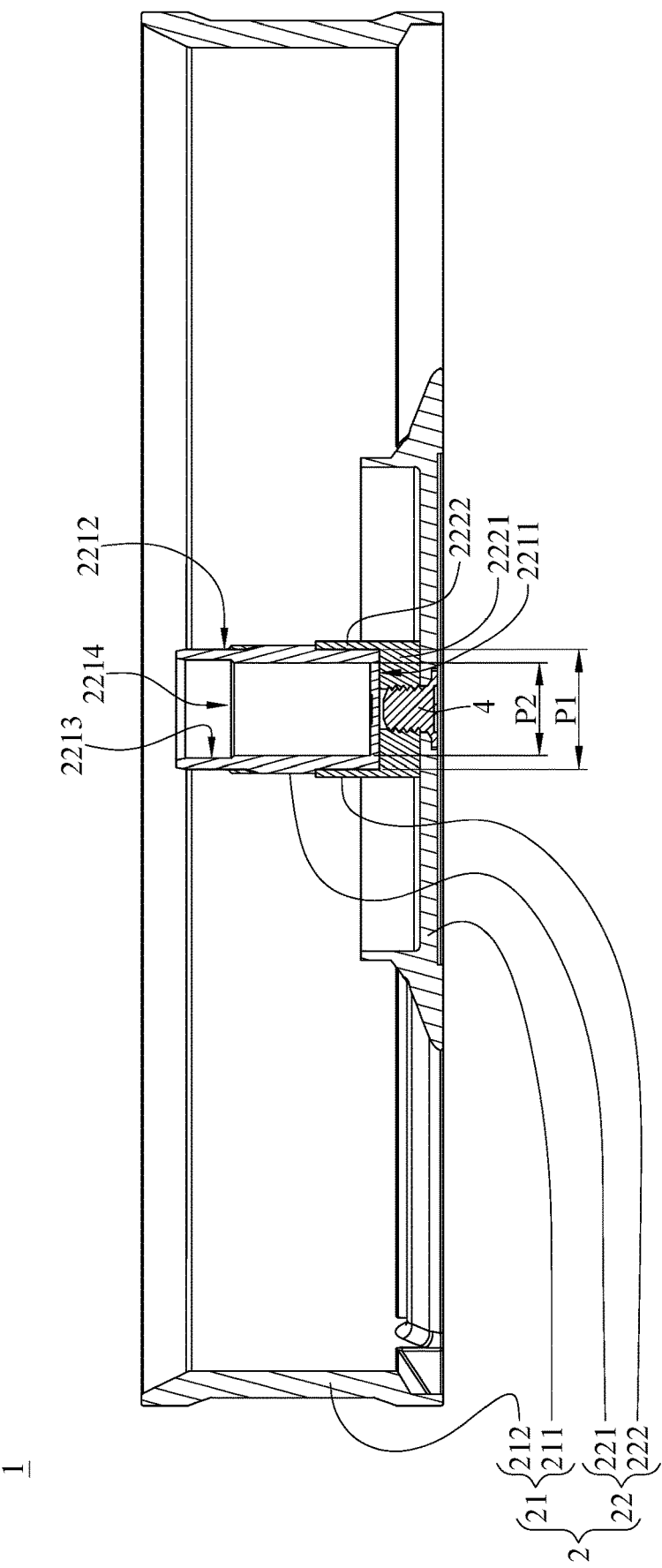
FIG. 4 is a cross-sectional view of the fan frame in FIG. 2.

In this embodiment, a part of the buffer 222 is clamped between the shaft tube 221 and the frame 21. Specifically, please refer to FIG. 2 to FIG. 4, where FIG. 3 is an exploded view of the fan frame 2 in FIG. 2, and FIG. 4 is a cross-sectional view of the fan frame 2 in FIG. 2.

In this embodiment, the shaft tube 221 may have a bottom surface 2211, an outer surface 2212 and an inner surface 2213. The outer surface 2212 is connected to a periphery of the bottom surface 2211. The inner surface 2213 faces away from the outer surface 2212 and surrounds an accommodation recess 2214. The accommodation recess 2214 may accommodate a shaft of the fan impeller. The buffer 222 may include a bottom part 2221 and a side part 2222 connected to the bottom part 2221. The bottom part 2221 of the buffer 222 is stacked on the bottom surface 2211 of the shaft tube 221, and the side part 2222 of the buffer 222 is stacked on the outer surface 2212 of the shaft tube 221. That is, the shaft tube 221 is inserted into the side part 2222 of the buffer 222, the outer surface 2212 and the bottom surface 2211 of the shaft tube 221 are respectively in contact with the side part 2222 and the bottom part 2221 of the buffer 222, such that the buffer 222 covers the bottom surface 2211 of the shaft tube 221 and a part of the outer surface 2212.

In this embodiment, a part of the buffer 222 is surrounded by an extension surface P1 of the outer surface 2212 and an extension surface P2 of the inner surface 2213 of the shaft tube 221 and is clamped between the shaft tube 221 and the frame 21. Accordingly, the buffer 222 may absorb the vibration generated by an operation of the fan device 1 more effectively.

In this embodiment, a part of the buffer 222 is located outside the area surrounded by the extension surface P1 of the outer surface 2212 of the shaft tube 221, but the present disclosure is not limited thereto. In other embodiments, the buffer may be completely surrounded by the extension surface of the outer surface of the shaft tube, or may be completely surrounded by the extension surface of the inner surface of the shaft tube.

In this embodiment, the fan frame 2 may include a fastener 4. The fastener 4 is disposed through the base 211 of the frame 21 and fastened into the buffer 222 of the shaft seat 22. The fastener 4 is spaced apart from the shaft tube 221. Accordingly, the fastener 4 may fix the buffer 222 on the base 211 of the frame 21. In addition, the fastener 4 is spaced apart from the shaft tube 221, so that the vibration generated by the operation of the fan device 1 is transmitted from the shaft tube 221 to the buffer 222 so as to be absorbed by the buffer 222 instead of being directly transmitted to the frame 21 via the fastener 4 from the shaft tube 221.

In this embodiment, the base 211 of the frame 21 may have a first positioning structure L1, and the bottom part 2221 of the buffer 222 may have a second positioning structure L2. The second positioning structure L2 and the first positioning structure L1 are a protrusion and a recess matching each other, and the second positioning structure L2 is detachably inserted into the first positioning structure L1. Accordingly, the buffer 222 is fixed to the frame 21 via the cooperation of the first positioning structure L1 of the base 211 of the frame 21 and the second positioning structure L2 of the bottom part 2221 of the buffer 222.

In this embodiment, the first positioning structure L1 is recessed inward from the base 211 of the frame 21, and the second positioning structure L2 protrudes outward from the bottom part 2221 of the buffer 222, but the present disclosure is not limited thereto. In other embodiments, the first positioning structure may protrude outward from the base of the frame, and the second positioning structure may be recessed inward from the bottom part of the buffer.

In this embodiment, the buffer 222 may be made of thermoplastic polyurethane (TPU) or thermoplastic elastomer (TPE).

In this embodiment, the shaft tube 221 is made of polybutylene terephthalate (PBT), polycarbonate (PC), polyamide 66 (PA66), liquid-crystal polymer (LCP), polyphenylene sulfide (PPS) or acrylonitrile butadiene styrene (ABS).

According to the fan device and the fan frame disclosed in the above embodiments, since the buffer with a high elastic coefficient and desired vibration absorption capability is clamped between the shaft tube and the frame, the vibration generated by the rotation of the fan impeller is absorbed by the buffer before being transmitted to the frame, so that the vibration transmitted to the frame is significantly reduced. Accordingly, a noise generated by the rotation of the fan impeller and the vibration transmitted to other electronic components may be reduced, thereby maintaining the stability of the operation of other electronic components.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A fan device, comprising:
    a fan frame, comprising:
        a frame; and
        a shaft seat, comprising a shaft tube and a buffer, wherein the shaft tube has a bottom surface, an outer surface and an inner surface, wherein the outer surface is connected to a periphery of the bottom surface, the inner surface faces away from the outer surface and surrounds an accommodation recess, at least a part of the buffer is clamped between the shaft tube and the frame, the buffer comprises a bottom part and a side part connected to the bottom part, the bottom part of the buffer is stacked on the bottom surface of the shaft tube, and the side part of the buffer is stacked on the outer surface of the shaft tube; and
    a fan impeller, rotably disposed on the shaft tube of the shaft seat;
    wherein an elastic coefficient of the buffer is less than an elastic coefficient of the shaft tube.

2. The fan device according to claim 1, wherein at least a part of the bottom part of the buffer is surrounded by an extension surface of the outer surface of the shaft tube.

3. The fan device according to claim 1, wherein at least a part of the bottom part of the buffer is surrounded by an extension surface of the inner surface of the shaft tube.

4. The fan device according to claim 1, wherein the fan frame further comprises a fastener, the frame comprises a base and a surrounding wall, the surrounding wall is connected to the base and surrounds the fan impeller, and the fastener is disposed through the base of the frame and is fastened into the buffer of the shaft seat.

5. The fan device according to claim 4, wherein the base of the frame has a first positioning structure, the bottom part of the buffer has a second positioning structure, the second positioning structure and the first positioning structure are a protrusion and a recess matching each other, and the second positioning structure is detachably inserted into the first positioning structure.

6. The fan device according to claim 1, wherein the buffer is made of thermoplastic polyurethane or thermoplastic elastomer.

7. The fan device according to claim 1, wherein the shaft tube is made of polybutylene terephthalate, polycarbonate, polyamide 66, liquid-crystal polymer, polyphenylene sulfide or acrylonitrile butadiene styrene.

8. A fan frame, configured to support a fan impeller, comprising:
    a frame; and a shaft seat, comprising a shaft tube and a buffer, wherein the shaft tube is configured to support the fan impeller, the shaft tube has a bottom surface, an outer surface and an inner surface, wherein the outer surface is connected to a periphery of the bottom surface, the inner surface faces away from the outer surface and surrounds an accommodation recess, at least a part of the buffer is clamped between the shaft tube and the frame, the buffer comprises a bottom part and a side part connected to the bottom part, the bottom part of the buffer is stacked on the bottom surface of the shaft tube, and the side part of the buffer is stacked on the outer surface of the shaft tube;

wherein an elastic coefficient of the buffer is less than an elastic coefficient of the shaft tube.

9. The fan frame according to claim 8, wherein the fan frame further comprises a fastener, the frame comprises a base and a surrounding wall, the surrounding wall is connected to the base and is configured to surround the fan impeller, and the fastener is disposed through the base of the frame and is fastened into the buffer of the shaft seat.

10. The fan frame according to claim 9, wherein the base of the frame has a first positioning structure, the bottom part of the buffer has a second positioning structure, the second positioning structure and the first positioning structure are a protrusion and a recess matching each other, and the second positioning structure is detachably inserted into the first positioning structure.

\* \* \* \* \*